Aug. 9, 1949.     R. J. ROCKWELL     2,478,712
ELECTRODYNAMIC PHONOGRAPH PICKUP
Filed April 3, 1947     2 Sheets-Sheet 1
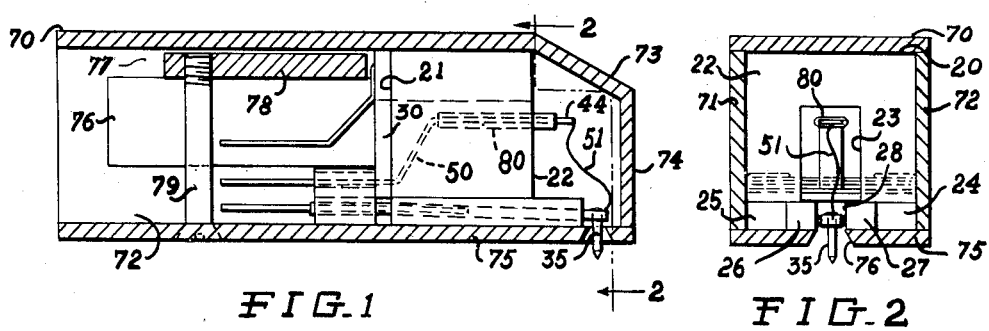
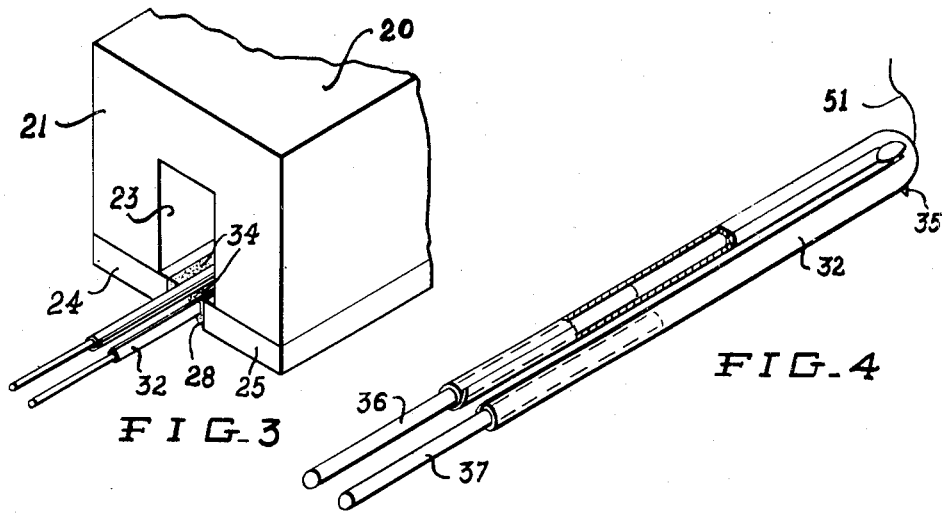
INVENTOR.
RONALD J. ROCKWELL
BY
HIS ATTORNEYS

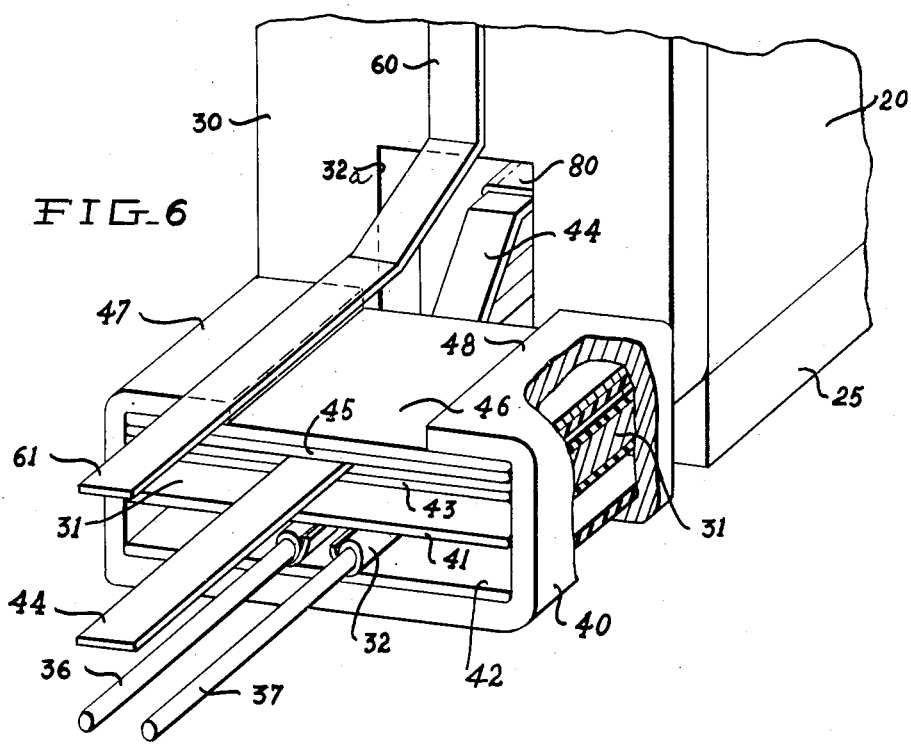
FIG_6
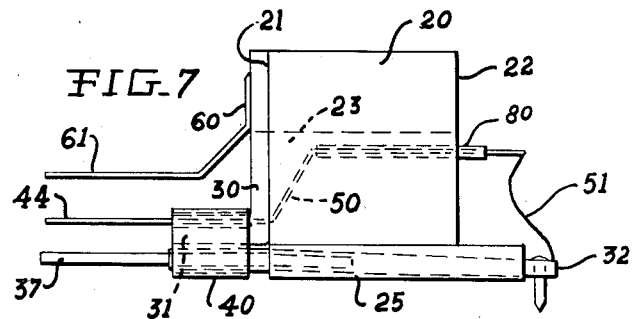
FIG_7
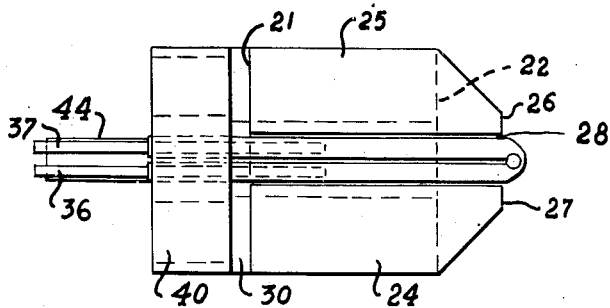
FIG_8
INVENTOR.
RONALD J. ROCKWELL
BY
HIS ATTORNEYS Patented Aug. 9, 1949

2,478,712

UNITED STATES PATENT OFFICE 2,478,712

ELECTRODYNAMIC PHONOGRAPH PICKUP

Ronald J. Rockwell, Cincinnati, Ohio, assignor to Crosley Broadcasting Corporation, Cincinnati, Ohio, a corporation of Ohio Application April 3, 1947, Serial No. 739,246

8 Claims. (Cl. 179—100.41)

1

This invention relates to an electromagnetic pick-up unit for use with sound records, whereby stylus vibrations, caused by such records, are transformed to corresponding electrical manifestations, and the invention more particularly pertains to such a pick-up unit that is adapted for use with sound records of either the lateral cut or vertical cut type. The pick-up unit is of the kind employing a single loop of non-magnetic, electrically conducting material, said loop being disposed between the poles of a magnet and moved or distorted, therein, by a stylus, said loop forming the closing portion of an electrical circuit actuating a translating system.

It has long been an objective in the sound reproduction art to provide a mechanically moved coil, for an electromagnetic pick-up, which is light and, therefore, requires very small forces to move it, which responds with high fidelity to the entire audible frequency range, and which is free of collateral noise and distortion attributable to the natural vibration frequency of the various parts of the device.

I have devised such a light weight, low inertia conductor embodying these desirable features. In its broadest aspect, the device employs a single loop of electrically conducting, non-magnetic material which is disposed in a single air gap between the poles of a magnet, the loop having secured thereto a stylus adapted to sense the sound records with which it is to be used and to transmit mechanical movement to the loop. The novel loop is made of lap-seamed tubular material formed into a long narrow U-shaped configuration, said loop being supported by its legs so as to be disposed along a narrow air gap between closely set poles of a magnet. The bight of the loop holds the stylus, and rocking movement of the stylus or axial movement of the stylus, causes the loop to twist or flex in the magnetic field to generate an electric current. Inasmuch as the material of which the loop is made is of an open lap-seamed construction, and, as the loop is long and narrow, the loop is easily twisted on its longitudinal axis and is flexible out of the plane of the loop, but strongly resists flexing within the plane of the loop. Such action of the loop structure is utilized so that the twisting of the loop occurs when the stylus is rocked by laterally cut records and the flexing of the loop occurs when the stylus is axially shifted by vertical cut records.

In the event the loop is to be actuated by laterally cut records, the ends of the loop act as two terminals for connection to the electrical circuit. In the event the loop is to be actuated by vertically cut records the two ends of the loop act as one terminal and a very flexible wire connection attached to the bight of the loop acts as the other terminal, to complete the electrical circuit.

The loop is constructed of light, strong and flexible metal, forming, with the stylus, the only movable mass, which is of low inertia and highly responsive to stylus vibrations. The extreme ease with which the loop can be twisted and flexed, and its light mass, permits the stylus to follow high frequency vibrations with great fidelity. Although any light, strong, flexible non-magnetic electrical conductor may be used for the loop, I preferably choose an aluminum alloy including, approximately, .5 per cent of magnesium, .5 per cent manganese, 4 per cent copper, 94 per cent aluminum, and traces of iron and silicon. I also prefer to use a permanent magnet of substantially block proportions, to create my magnetic field, and provide special pole pieces between which the loop is disposed. For a stylus I propose to use any commercially useful stylus, but prefer to use either an aluminum tube tipped with a sapphire point or an osmium rod having a stylus point contour on one end. I also use various acoustic damping materials, which are selectively placed at points tending to vibrate resonantly, for the purpose of preventing collateral noise.

I also provide pins which are inserted into the open tube ends of the U-shaped loop whereby, by sliding the pins in or out, the natural frequency of the loop may be tuned, and by which the ends of the tube may be held from collapsing when said ends are clamped in a supporting bracket which holds the loop disposed between the magnet poles.

It will be apparent that my electromagnetic pick-up unit is eminently useful in the playing of temporary, fragile or soft recordings, as well as ordinary commercial records, yet furnishing a reproduction of high fidelity over the entire useful audible sound range, free of disturbances caused by resonance vibrations of the part, such results being attributable to the novel materials and structures used in the construction of the device.

Therefore, the principal object of my invention is to provide a novel electromagnetic sound pickup head of the type comprising an electrically conducting loop moved by a stylus in the air gap between the poles of a magnet.

Another object of the invention is to provide such an electromagnetic pick-up device wherein the loop is made of tubular material formed in a long narrow U-shaped configuration.

Another object of the objection is to provide such a pick-up device wherein the tubular material contains a longitudinally-lapped-seam disposed on the inner aspect of the U-shaped formation.

Another object of the invention is to provide such an electromagnetic pick-up device in which the loop is made of a high strength, flexible aluminum alloy.

Another object of the invention is to provide such an electromagnetic pick-up in which the loop is made of an electrically conducting, non-magnetic tubular material.

Another object of the invention is to provide such an electromagnetic pick-up device in which the bight end of the loop supports a stylus.

Another object of the invention is to provide such a loop made of tubular material in which the natural frequency response of the loop may be tuned by means of pins inserted into the open ends of such tubular material.

Another object of the invention is to provide electric terminal leads from the loop, permitting its use in conjunction with either lateral cut or vertical cut sound records.

Another object of the invention is to provide such an electromagnetic pick-up device in which the loop consists of a single U-shaped turn disposed in a single air gap between two poles of a permanent magnet.

Another object of the invention is to provide such a device in which the legs of the loop are used to complete an electric circuit while sensing lateral cut records.

Another object of the invention is to provide such an electromagnetic pick-up device in which a flexible, light weight connector is attached to the bight end of the loop to be used as one terminal of an electric circuit, for use when the device is used on vertical cut sound records.

Further objects, and objects relating to the details and economies of construction will definitely appear from the detailed description to follow.

In one instance, I have accomplished the objects of my invention by the devices and means set forth in the following specification. My invention is clearly defined and pointed out in the appended claims.

Structures, constituting the preferred embodiment of my invention, are illustrated in the accompanying drawings, forming a part of this specification, in which:

Fig. 1 is a side elevation of the novel device, showing its disposal within a case which is shown in section.

Fig. 2 is a section through the device of Fig. 1, on the line 2—2 thereof.

Fig. 3 is a perspective view of a portion of the magnet as looked at from the rear face, showing the disposition of the loop between the pole pieces thereof, showing the pins in the loop, and showing the disposition of acoustical damping material between the pole pieces and the loop.

Fig. 4 is a perspective view of the loop, with the pins inserted therein, parts being broken away to show the internal disposition of the parts.

Fig. 5 is an enlarged perspective view of the ends of the loop, showing the lapped-seam construction thereof, and showing the plastic material filling the open seams.

Fig. 6 is a perspective view, with certain parts broken away, of the rear end of the novel pickup device as removed from the casing.

Fig. 7 is a side elevation of the pick-up device as removed from the casing.

Fig. 8 is a bottom plan view of the device as removed from the casing.

In the drawings, the same reference numerals refer to the same parts throughout the several views and the sectional views are taken looking in the direction of the arrows at the ends of the section lines.

In the description to follow, preferable materials and approximate dimensions of material will be given for various parts of the device in order that the most useful embodiment thereof for use with audible sound records is presented.

I employ a permanent magnet 20 of approximately square block proportions. The magnet has a rear face 21 (Fig. 3), a front face 22 (Fig. 2) and a passageway 23 extending from the rear face to the front face and opening downwardly to form the legs of a rectangular U-shaped magnet. I prefer to use a magnet of approximately .4 inch in length between the front face and the rear face, approximately .4 inch in height between the top of the magnet and the bottom of the legs thereof, and approximately .4 inch in width between the sides thereof, with an air gap passageway having a height of approximately .25 inch and a width of about .15 inch. For the magnet material I prefer to use an aluminum-nickel-cobalt-iron alloy. On the bottom of each leg of the magnet is soldered, or otherwise fastened, a magnet-steel pole piece, said pieces 24 and 25 being each approximately .06 inch in thickness, each of said pole pieces being flush on the side and rear faces of the magnet with the edges of the magnet, each of said pole pieces extending slightly toward the interior of the passageway from the walls of the passageway so as to leave an air gap therebetween of about .093 inch, and each of said pole pieces extending approximately .2 inch in front of the front face of the magnet, said forwardly projecting portions of the pole pieces being shaded to blunt points 26 and 27 as shown in Fig. 8. In this relatively long and narrow air gap, between the interior edges of the pole pieces, the electric conductor loop, to be described, is disposed. Soldered, or otherwise fastened, to the rear face of the magnet is a brass plate 30 (Figs. 6 and 7) having a rearwardly extending step 31, the bottom of which step is in the plane of the bottom of the legs of the magnet. Brass plate 30 has an aperture 32a therein, which is the size of the passageway opening in the magnet at its rear end and congruent therewith.

The rearwardly extending step 31, of plate 30, is slightly narrower in width than the vertical portion which is soldered to the rear magnet face 21. This plate 30 and its rearwardly extending step 31 acts as a standard brace for holding the electrical loop conductor in the air gap between the pole pieces of the magnet, and for holding a rigid conductor, used when vertical cut records are sensed, which conductor extends through the upper part of the passageway between the legs of the magnet.

Referring, especially, to Figs. 3, 4, 5 and 6, I provide tubular conductor loop 32, which, preferably, is made of the aluminum alloy mentioned previously, from sheet material approximately .0025 inch in thickness, rolled into a lapped-seamed tube having an internal diameter of approximately .01 inch, making the tubing have a minimum diameter of about .015 inch. The tube form is seen best in Fig. 5 where the ends of the conductor loop are shown. It will be seen that the tubing is lap-seamed with an overlap of approximately 30° of the circumference, although such angle is not extremely critical. Filling the seam is plastic acoustical damping material 33 which, preferably, is a nitrocellulose-camphor product plasticized with castor oil or tricresyl phosphate and dissolved in acetone for application, so that such material, upon the drying of the acetone, assumes a tacky viscous state in which it prevents resonance vibration of the tubing without substantially interfering with the twisting and flexing action, to be described.

Referring to Fig. 4, the tube 32 is bent into a long narrow U-shaped formation, preferably, with the seam 32 on the inner aspect of said U-shaped formation, the space between the parallel legs of the U being approximately .03 inch. As the bight formed by the tight bend of the tube has a very small radius, the tubing may be collapsed at the bend, if desired. The U-shaped formation forms an electrically conductive loop which may be disposed in the air gap between the magnet pole pieces so as to very nearly, but not quite, touch the inner edges of said pole pieces when said U-shaped loop is twisted on its long axis or flexed upwardly and downwardly in a vertical manner. The space between the loop and the inner edges of the pole pieces and the space between the legs of the loop, is filled with a damping material, which preferably is a dimethyl-silicon-oxide polymer material containing a soap to form a viscous mass. For the purpose of decreasing the effective mass of the damping material it may be mixed with wood pulp, that made of balsa wood being most desirable because of its low density. This damping material 34 is shown in Fig. 3.

In the bight end of the loop is cemented a stylus 35 which, when the unit is placed in its casing presents a downwardly pointing record engaging end as shown in Figs. 1 and 2. By reference to Figs. 1, 2 and 3 it will be seen that the conductor loop is so disposed in the air gap that its plane is horizontal, and, hence, when the stylus engages laterally cut horizontally disposed disc sound records the loop will be twisted on its long axis by the sound track, and, when the stylus is used with vertically cut horizontally disposed disc sound records, the stylus will respond vertically and flex the loop upwardly and downwardly in the air gap. In the former circumstance, the two ends of the loop form two terminals to complete the usual electric circuit of the sound translating device. In the latter case the two ends of the loop are used as one terminal and the front, bight end, of the loop is used as the other terminal for completing the electric circuit of the sound translating device.

I provide pins 36 and 37 (Fig. 4) made of stiff electrically conducting material, such as steel wire, for insertion in the open ends of the tube, said pins being snugly fitted therein. The pins by their insertion into the tube have several functions. One of these functions is to act as a tuning means, whereby the natural vibration frequency of the loop may be adjusted by moving the pins, or either of them, in or out of the tube. Another function of these pins is to act as internal supports so that the ends of the tube may be clamped in a clamping means for supporting the loop in the air gap, as will be described, without crushing the tube ends. A third function of these pins as to act as terminals to which electric conductors may be easily soldered when it is desired to connect the device to the electric circuit in which it is used. It will also be apparent that the internal ends of the pins which extend beyond the clamp act as cantilevers and prevent breaking of the tubes on the clamp edge.

Referring to Fig. 6, I provide a phosphor bronze clamp 40 by which the loop conductor 32 is held securely against the bottom of the step 31, with a sheet of mica 41 insulating the loop from the step 31, and a sheet of mica 42 insulating the loop from the clamp. On top of the step 31 is a sheet of mica 43 on which is placed a rigid phosphor bronze ribbon conductor 44 which is in turn covered by a sheet of mica 45 held in place by a phosphor bronze plate 46. The ears 47, 48 of the clamps, are bent over to clamp the conductors tightly in place.

It will be seen, from Fig. 6, that the pins 36 and 37 are free for soldering electric terminals thereto, as is the end of conductor 44. Conductor 44 has a forwardly extending portion which is bent angularly upward and then horizontally so that it passes through the passageway between the legs of the magnet near the top thereof. This conductor 44 extends slightly beyond the front face of the magnet as seen in Fig. 1 and is electrically connected to the front end of the loop by wire 51 which is made, preferably, of yielding wire about .003 inch, or less, in diameter, so that vertical or twisting movement of the loop, as it is distorted by the sound records, will not be impeded by any stiffness thereof. As seen in Fig. 1, the conductor loop 32 is given a slight downward set, when it is being secured in the clamping means, in order that when the stylus is placed on the record and the effective weight of the pick-up device and associated holding arms come to bear thereupon, the conductor loop will be straightened so as to assume a horizontal position in the midline point of the pole pieces between the legs of the magnet. If such original downward set to the loop were not provided, the weight of the pick-up device and associated supporting arm structure would bend the loop upwardly out of the field of greatest magnetic density.

Soldered to plate 30 (Figs. 6 and 7) is a phosphor bronze strip 60 having a rearwardly extending portion 61 which may be used as an electric terminal for grounding purposes.

Referring to Figs. 1 and 2, I provide a casing within which the pick-up device may be mounted, said casing being made of light weight non-magnetic material. The casing has a top 70, sides 71 and 72, a downwardly sloping front section 73, a vertical front section 74, and a bottom closure plate 75 containing an aperture 76 through which the point of the stylus may protrude. On each of the side walls 71 and 72, in the rear part of the casing, is secured a flat plate which extends slightly inwardly of the inner wall of the casing. As shown in Fig. 1, plate 76 on wall 72 extends nearly to the top 70 leaving a space 77, which acts to provide a ledge-like slot between the top edge of the plate 76 and the top 70, which accommodates one edge of a lock-nut plate 78. The forward end of the plate abuts against the plate 30 of the magnet. As the same provision is made on the side piece 71, and as lock-nut plate 78 is made large enough to extend across the interior width of the casing, the said nut plate may be slid in and out between said side plates and the top of the casing. Lock-nut plate has threaded holes therein to receive locking bolts such as bolt 79, by which the bottom plate 75 is secured in place. In assembly of the device the lock-nut plate 78 is slid in place though the open bottom of the casing, the pick-up device assembly is placed in the casing with the top of the magnet against the top of the casing. The forward upper edge of the magnet is positioned at the corner between top and bottom portion 73 of the casing and the rear of the magnet is held by the side plates described.

As the bottom plate 75 is put in place, the stylus will project through the hole 76, and the bottom plate will securely hold the magnet between it and the top of the casing. Thus the pick-up unit is held from movement.

Suitable terminal couplings may be provided whereby the device is slipped onto a pick-up device holding arm, to complete electrical connections to a translator in the usual manner.

If desired, an insulating sleeve, such as sleeve 80 (Fig. 1) made of woven fabric or molded tubing, may be provided for the conductor 44 to prevent accidental contacts thereof with the magnet.

It will be understood that the tubular loop construction, which I provide, is unusually strong for its dimensions, and is especially resistant to resonance vibration interfering with the fidelity of reproduction of the sensed sound record. The loop is damped by reason of the acoustical plastic material provided in the open seams of the tube, and by the selective use of the viscous material between the sides of the loop and the edges of the pole pieces, and between the legs of the loop.

I do not restrict this invention to the use of permanent magnets as it is obvious that electromagnets may be substituted therefor and used to serve the same function. It is also apparent that where I have specified phosphor bronze, aluminum alloy, and the like, equivalent materials having similar characteristics may be used without in any way departing from the spirit of the invention. Moreover, although I have specified certain dimensions as preferable for use with the materials preferred, which gives unusually good results, such dimensions and characteristics may be varied somewhat according to the effects desired.

One of the most important features of this pick-up device is its light weight as a whole, and in the extreme flexibility, lightness and strength of the single moving part therein. Inertial effects damaging to the recording medium and tending to distort the recorded sound have, by this invention, been reduced to a minimum. By use of the light weight aluminum alloy which is specified as preferred I reduce the mass which has to be vibrated to as little as seven milligrams.

I am aware that the device shown herein may be varied considerably without departing from the spirit of my invention, and therefore, I claim my invention broadly as indicated by the appended claims.

Having thus described my invention, what I claim as new and useful and desire to secure by Letters Patent is:

1. Vibration translation apparatus comprising a vibratory element, means for producing a magnetic field, and an electrical conductor adapted to be inductively disposed in said magnetic field for supporting said element, said conductor comprising a piece of open lap-seamed tubing of a U-shaped form, said tubing being made of a metal alloy containing approximately .5 per cent magnesium, .5 per cent manganese, 4 per cent copper, and 94 per cent aluminum, with traces of iron and silicon, and means for mounting said conductor in said field.

2. Vibration translation apparatus comprising a vibratory element, means for producing a magnetic field, and an electrical conductor adapted to be inductively disposed in said magnetic field for supporting said element, said conductor comprising a piece of open lap-seamed tubing of a U-shaped form, said tubing being made of a light weight flexible metal sheeting, with the seams on the inside of the U, a tacky plastic material disposed within said seams to reduce resonance induced by sound vibrations, and means for mounting said conductor in said field.

3. A distortable electrically conductive stylus support for use solely with an electromagnetic sound translating device and for disposition in the field of such electromagnetic sound translating device, of the type employed with horizontally disposed disc sound records, including, in combination, a long U-shaped loop of open lap-seamed tubular non-magnetic metal, and a clamp in which the legs of the loop are mounted in contact with the clamp so the loop may be twisted on its long axis, or bent out of its plane, but which resists distortion in its plane.

4. In a pickup device, field-producing means including a pair of poles arranged to form a single long narrow air gap, the combination of a vibratory element, a U-shaped conductive support for said element, said support comprising a tube of metallic non-magnetic material having a lapped longitudinal seam on the interior of the U-shaped tube, the legs of the U being substantially parallel and slightly separated, the U formation fitting within the air gap along its length and in inductive relation to the magnet but without touching the poles of the magnet, and the free ends of the U extending slightly at one end of the gap, and a non-conductive bracket holding the extending free ends of the U, whereby the support forms a loop that may be twisted and flexed in the air gap.

5. In a pickup device of the type including a stylus and a pair of magnetic poles, a stylus support for use between said poles, including, in combination, a U-shaped formation of tubular electrically conductive but non-magnetic flexible metal inductively disposed in the gap between the magnetic poles, a slidably fitted pin inserted in the open end of each leg of the U-shaped formation, and means for holding the U-shaped formation by the ends of the legs, in the gap, the sliding of said pins in the legs permitting the natural mechanical vibratory frequency of the U-shaped formation to be selectively determined.

6. In a pickup device of the type including a stylus and a pair of magnetic poles, a stylus support adapted to be held in the gap between and in inductive relation to said poles, there to be twisted and flexed, including, in combination, a long narrow U-shaped body made of tubular metallic material having a longitudinal lap-seam on the inner aspect of the U, a slidable pin inserted in each of the open tube ends of the U-shaped body, the material of said U-shaped body being flexible, non-magnetic, and electrically conductive, and the pins being relatively stiff, whereby the U-shaped body may be held by clamping the exterior of the legs over the portion occupied by the pins, without crushing the tubular material, the portion of the U-shaped body not occupied by the pins being thereby left twistable and flexible, and a clamp for holding said legs.

7. In combination, a magnet having two pole pieces forming an air gap, and a piece of open lapped-seam tubular electrically conductive and non-magnetic material bent to an open ended long narrow loop and inductively disposed in the air gap, means for mounting said loop by its free ends, said loop being so arranged that it may readily be twisted on its effective central axis and flexed out of its plane, but so that it strongly resists forces tending to flex it in the direction of its plane.

8. An electromagnetic pickup device cooperable with stylus vibrating types of sound records, including, in combination, a long narrow U-shaped electrical conductor made of flexible tubular material and having an open lap-seam, means for holding the free ends of the U-shaped conductor insulated electrically, a magnet having opposed pole pieces forming a long narrow air gap, said holding means holding the U-shaped conductor along said air gap and spaced slightly from but inductively related to the poles, substantially in the region of greatest magnetic density, and a stylus held in the bight end of the U-shaped conductor so that rocking the stylus twists said conductor and so that axial movement of said stylus flexes said conductor out of its normal plane, whereby to cut the lines of magnetic force.

RONALD J. ROCKWELL.

REFERENCES CITED

The following references are of record in the file of this patent:

UNITED STATES PATENTS

| Number | Name | Date |
| --- | --- | --- |
| 267,326 | Childs | Nov. 14, 1882 |
| 441,525 | Wilber | Nov. 25, 1890 |
| 597,056 | Dieckmann | Jan. 11, 1898 |
| 870,300 | Levin | Nov. 5, 1907 |
| 1,182,922 | Mickley | May 16, 1916 |
| 1,915,804 | Smith | June 27, 1933 |
| 1,960,007 | Harrison | May 22, 1934 |
| 2,027,169 | Harrison | Jan. 7, 1936 |
| 2,034,872 | Keller | Mar. 24, 1936 |
| 2,039,824 | Morgan | May 5, 1936 |
| 2,239,717 | Hunt | Apr. 29, 1941 |
| 2,311,385 | Hasbrouck | Feb. 16, 1943 |
| 2,326,460 | Hasbrouck | Aug. 10, 1943 |
| 2,369,676 | Hunt | Feb. 20, 1945 |
| 2,415,932 | Brown | Feb. 18, 1947 |
| 2,435,487 | Adler | Feb. 3, 1948 |